(12) United States Patent
Livneh

(10) Patent No.: US 10,783,715 B2
(45) Date of Patent: Sep. 22, 2020

(54) AUGMENTED REALITY DISPLAY REFLECTIVE OF VISIBILITY AFFECTING FEATURES IN REAL-WORLD ENVIRONMENT

(71) Applicant: ELBIT SYSTEMS LTD., Haifa (IL)

(72) Inventor: Ofer Livneh, Modiin-Maccabim-Reut (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 16/476,763

(22) PCT Filed: Jan. 11, 2018

(86) PCT No.: PCT/IL2018/050042
§ 371 (c)(1),
(2) Date: Jul. 9, 2019

(87) PCT Pub. No.: WO2018/131035
PCT Pub. Date: Jul. 19, 2018

(65) Prior Publication Data
US 2020/0151958 A1    May 14, 2020

(30) Foreign Application Priority Data
Jan. 11, 2017    (IL) .......................................... 250081

(51) Int. Cl.
*G06T 19/00*    (2011.01)
*G06T 5/00*    (2006.01)
*G06T 15/20*    (2011.01)

(52) U.S. Cl.
CPC ............ *G06T 19/006* (2013.01); *G06T 5/008* (2013.01); *G06T 15/20* (2013.01); *G06T 2215/16* (2013.01)

(58) Field of Classification Search
CPC ....... G06T 19/006; G06T 5/008; G06T 15/20; G06T 2215/16
See application file for complete search history.

(56) References Cited

U.S. PATENT DOCUMENTS

| 6,616,454 B2 | 9/2003 | Ebersole, Jr. et al. |
| 2003/0193496 A1 | 10/2003 | Wada |

(Continued)

FOREIGN PATENT DOCUMENTS

| WO | WO 2004/049004 A2 | 6/2004 |
| WO | WO 2006/083762 A1 | 8/2006 |
| WO | WO 2016/098102 A1 | 6/2016 |

OTHER PUBLICATIONS

International Search Report issued in International Application No. PCT/IL2018/050042, dated Mar. 15, 2018.
(Continued)

*Primary Examiner* — Chong Wu
(74) *Attorney, Agent, or Firm* — Charles C. Achkar; Ostrolenk Faber LLP.

(57) ABSTRACT

Method and system for displaying augmented reality reflective of environmental features affecting visibility. Characteristics of a virtual object to be displayed on view of scene is determined. Environmental features affecting visibility along a line-of-sight from scene origin to virtual object are detected. When detected feature is at least one non-obstructing feature, its effect on visibility is determined, and virtual object is displayed superimposed onto view of scene such that appearance of virtual object is consistent with determined effect on visibility. When detected feature includes an amorphous obstructing feature, its range and contour is determined, and obstructed portions of virtual object is determined based on difference between range of virtual object and range of amorphous obstructing feature, and virtual object is displayed superimposed onto view of scene (Continued)

such that determined obstructed portions of virtual object appear obstructed in displayed view.

19 Claims, 5 Drawing Sheets

(56) References Cited

U.S. PATENT DOCUMENTS

| | | |
|---|---|---|
| 2012/0212477 A1 | 8/2012 | Grindstaff et al. |
| 2014/0063055 A1 | 3/2014 | Osterhout et al. |
| 2015/0302658 A1 | 10/2015 | O'Connor et al. |
| 2015/0348330 A1 | 12/2015 | Balachandreswaran et al. |
| 2016/0171704 A1 | 6/2016 | Raghoebardajal et al. |

OTHER PUBLICATIONS

Written Opinion of the International Searching Authority issued in International Application No. PCT/IL2018/050042, dated Mar. 15, 2018.

Claus B, Madsen et al: "Real-Time Image-Based Lighting for Outdoor Augmented Reality under Dynamically Changing Illumination Conditions", Proceedings: International Conference on Graphics Theory and Applications Proceedings: International Conference on Graphics Theory and Applications, Jan. 1, 2006 (Jan. 1, 2006), pages URL:http://vbn.aau.dk/ws/files/4968754/grapp06.pdf [retrieved on Mar. 7, 2018].

Taiki Fukiage et al: "Reduction of contradictory reality by using partial occlusion in mixed reality by using characteristics of transparency perception", Mixed and Augmented Reality (ISMAR), 2012 IEEE International Symposium on, IEEE, Nov. 5, 2012 (Nov. 5, 2012), pp. 129-139, XP032309059, DOI:10.1109/ISMAR.2012.6402549, ISBN: 978-1-4673-4660-3 abstract section 5.1; figure 1.

IL Search report and Office Action issued in IL Application No. 250081 dated Jul. 20, 2017 and English language translation thereof.

IL Office Action issued in IL Application No. 250081 dated Jul. 10, 2018 and English language translation thereof.

Notice before Allowance for IL Patent Application No. 250081 dated Apr. 7, 2019 and English language translation thereof.

AUGMENTED REALITY DISPLAY REFLECTIVE OF VISIBILITY AFFECTING FEATURES IN REAL-WORLD ENVIRONMENT

CROSS-REFERENCE TO RELATED APPLICATIONS

This application is a National Phase application filed under 35 U.S.C. § 371 of PCT International Application No. PCT/IL2018/050042 with an International Filing Date of Jan. 11, 2018, which claims priority to Israel Patent Application No. 250081, filed on Jan. 11, 2017, the entire contents of which are incorporated herein by reference.

FIELD OF THE INVENTION

The present invention relates to imaging systems and computer-simulated reality, in general, and to realistic display of virtual reality elements in a physical environment, in particular.

BACKGROUND OF THE INVENTION

Virtual reality (VR) refers to the computer-generated simulation of an artificial environment that can be interacted with in a seemingly real manner. The VR user typically perceives the simulated environment by experiencing visual and auditory stimuli using dedicated equipment, such as a wearable headset or head-mounted display (HMD). Additional haptic devices may be configured to provide tactile stimulus and/or obtain tactile feedback from the user. The simulated environment may correspond to a real-world physical environment, such as in a pilot training simulation, or may represent a non-real or fictional environment, such as in a role-playing video game or 3D movie.

Augmented reality (AR) is similar to VR but involves enhancing the current perception of a real-world environment instead of replacing it with a simulated environment. AR technology presents supplementary information, such as virtual imagery or audio content, overlaid onto a view of a physical environment. The supplementary information may be projected onto a personalized display device adapted for AR use, such as an HMD or other wearable apparatus, or projected onto the display screen of a mobile computing device, such as a smartphone. The supplementary content is typically presented in real-time and in the context of features present in the physical environment.

Both VR and AR are increasingly utilized in a variety of different technical fields and applications. One such application is military training. Military training events may include combinations of live, virtual and/or constructive simulations of an environment, but nowadays predominantly involve VR implementations. The simulation may involve displaying images of the training arena to the trainee. The displayed images may include real elements in the arena, such as an actual target (e.g., an enemy tank), as well as virtual elements or effects to be depicted (e.g., an explosion of an artillery shell or another fired weapon). In rare circumstances, the simulator may display virtual elements alongside real elements, such as by projecting representations of the virtual elements superimposed onto an image of the physical environment. The simulator may be embedded in a vehicular platform, such as an aircraft, a tank, a jeep, or a naval vessel, which is operated by the trainee. Such simulation training on a platform is influenced by the environmental conditions in the training arena, as well as the capabilities and limitations of the platform sensors that capture images of the training arena. In general, simulation training on a platform is either: fully live training without the display of virtual elements, or a virtual simulation that displays virtual elements which do not reflect the physical conditions in the environment. For example, visibility may be affected by certain weather conditions, such as fog, mist, atmospheric particles, smoke, rain, snow, and the like. A displayed virtual element in a virtual simulation may appear artificial or unrealistic in the context of other elements in the environment, such as being overly accentuated or insufficiently accentuated in the displayed image. Such an unrealistic depiction of the virtual elements may diminish the fidelity and effectiveness of the pertinent simulation training.

U.S. Pat. No. 6,616,454 to Ebersole, Jr. et al, entitled: "Method of simulating nozzle spray interaction with fire, smoke and other aerosols and gases", discloses the production of a real-time computer graphics airflow simulation effect where a simulated stream of an extinguishing agent, such as water or foam from a nozzle, affects the path of other simulation components, such as a fire and smoke plume. The extinguishing agent, fire and smoke plume are modeled as particle systems, and a force on the fire and smoke particles is calculated from the direction and speed of extinguishing agent particles. The application of the calculated force simulates the visual effect of the extinguishing agent stream causing airflow that alters the motion of the fire and smoke particles.

U.S. Patent Application No. 2003/0193496 to Wada, entitled: "Image processing system, image processing method, semiconductor device, computer program, and recording medium", is directed to a technique for rendering 3D images with realistic visual effects. A geometric model in a virtual 3D space is provided, such as objects or polygons making up a predetermined surface of an object in virtual 3D space. The distance from a predetermined point to each pixel of the geometric model is calculated, and the drawing information for each pixel is adjusted based on the calculated distance. For example, if the predetermined point in the virtual 3D space is a point of view looking at the geometric model, the drawing information is adjusted based on the distance from the point of view.

PCT Patent Application Publication No. WO 2004/049004 to Narasimhan et al, entitled: "Systems and methods for modeling the impact of a medium on the appearances of encompassed light sources", discloses modeling the effects of multiple scattering on light rays in the atmosphere. An image of a light source is captured, and the light source encompassed in a medium is identified. Multiple scattering of the light from the light source in the medium is modeled using a Legendre polynomial series solution to a Radiative Transfer Equation for Spherical Media (RTE-SM) called an Atmospheric Point Spread Function (APSF). The characteristics of the medium are determined using the APSF. For example, by observing a street light in bad weather at night, it is possible to determine using the APSF whether the bad weather is haze, mist, fog or rain. It is also possible to remove and/or add an effect of the medium on the light source captured in the image.

PCT Patent Application Publication No. WO 2006/083762 to Fairclough, entitled: "Systems and methods for the real-time simulation of atmospheric lighting effects", discloses the realistic simulation of natural atmospheric lighting phenomena. An image realistically representing a scene of natural atmospheric lighting phenomena is provided in a simulation environment, the image having an atmosphere, atmospheric particles, and light, such as a visual representation of an outdoor scene. A viewing position is provided, along with one or more viewing objects associated with a view of the scene. A color of at least one image portion is determined in real-time, to represent at least one visual effect of the atmospheric lighting phenomena, from a change in: the view; the viewing position; the viewing objects; the atmosphere; the atmospheric particles; and/or the light. Images of the scene with the determined image portion colors are then rendered in real-time.

U.S. Patent Application No. 2012/0212477 to Grindstaff et al, entitled: "Fast haze removal and three-dimensional depth calculation", is directed to a method of removing haze from a color image. A digital input image is received, and a digital output image is generated using an estimated transmission vector that is substantially equal to an inverse blue channel of the digital input image, such that the output image contains less haze than the input image. The blue channel may be normalized, such as by dividing the values of the blue channel by a constant that represents light scattered in the input image. A three-dimensional haze reduced image may be generated based on a depth map of a two-dimensional digital input image.

SUMMARY OF THE INVENTION

In accordance with one aspect of the present invention, there is thus provided a method for displaying augmented reality reflective of environmental features affecting visibility. The method includes the procedures of: determining characteristics of at least one virtual object to be displayed on a view of a scene, and detecting at least one visibility affecting environmental feature at the scene present along a line-of-sight (LOS) between the scene origin to the virtual object. When the detected feature is at least one non-obstructing feature, the method includes determining the effect on visibility due to the non-obstructing features present along the LOS between the scene origin to the virtual object, and displaying the virtual object superimposed onto a view of the scene such that the appearance of the virtual object in the displayed view is consistent with the determined effect on visibility as perceived from the scene origin. When the detected feature includes an amorphous obstructing feature, the method includes determining the range and the contour of the amorphous obstructing feature, determining obstructed portions of the virtual object based on the difference between the range of the virtual object and the range of the amorphous obstructing feature, and displaying the virtual object superimposed onto a view of the scene such that the determined obstructed portions of the virtual object appear obstructed in the displayed view. The virtual object may be displayed on an image of the scene, or may be displayed on a see-through display overlaid onto a view of the scene. The non-obstructing feature may be an amorphous non-obstructing feature. The virtual object may be displayed with at least one visual attribute modified. The modified visual attribute may include: the brightness, the contrast, and/or the color intensity of the virtual object. The environmental feature at the scene or the effect on visibility may be determined using: image processing; a comparison of different images of the scene; an examination of spectral properties of at least one image of the scene; information relating to the scene obtained from at least one sensor; a geographic information source; a weather/climate information source; a digital terrain model; a prediction model; a machine learning process; and/or a manual indication. Determining the effect on visibility due to at least one non-obstructing feature may include determining the effect of shadows in the scene, based on detected shadow casting elements and the relative location of at least one light source in the scene.

In accordance with another aspect of the present invention, there is thus provided a system for displaying augmented reality reflective of environmental features affecting visibility. The system includes at least a processor and a display. The processor is configured to determine characteristics of at least one virtual object to be displayed on a view of a scene, and to detect at least one visibility affecting environmental feature at the scene present along a LOS between the scene origin to the virtual object. When the detected feature is at least one non-obstructing feature, the processor is further configured to determine the effect on visibility due to the non-obstructing features present along the LOS between the scene origin to the virtual object, and when the detected feature includes an amorphous obstructing feature, the processor is further configured to determine the range and the contour of the amorphous obstructing feature, and to determine obstructed portions of the virtual object based on the difference between the range of the virtual object and the range of the amorphous obstructing feature. The display is configured to display the virtual object superimposed onto a view of the scene, such that the appearance of the virtual object is consistent with the determined effect on visibility as perceived from the scene origin when the detected feature is at least one non-obstructing feature, and to display the virtual object superimposed onto a view of the scene such that the determined obstructed portions of the virtual object appear obstructed in the displayed view when the detected feature includes an amorphous obstructing feature. The system may further include an image sensor, configured to capture an image of the scene, where the virtual object is displayed on the image. The display may be a see-through display, configured to display the virtual object overlaid onto a view of the scene. The non-obstructing feature may be an amorphous non-obstructing feature. The virtual object may be displayed with at least one visual attribute modified. The modified visual attribute may include: the brightness, the contrast, and/or the color intensity of the virtual object. The environmental feature at the scene or the effect on visibility may be determined using: image processing; a comparison of different images of the scene; an examination of spectral properties of at least one image of the scene; information relating to the scene obtained from at least one sensor; a geographic information source; a weather/climate information source; a digital terrain model; a prediction model; a machine learning process; and/or a manual indication. Determining the effect on visibility due to at least one non-obstructing feature may include determining the effect of shadows in the scene, based on detected shadow casting elements and the relative location of at least one light source in the scene. The system may further include at least one sensor configured to detect information relating to environmental feature in the scene. The system may further include a database that includes information relating to environmental features in the scene. The system may further include a simulation generator configured to provide information relating to the virtual object to be displayed. The image sensor may be situated on a moving platform.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a system and method for displaying an augmented reality image in which virtual objects appear in a realistic manner. In particular, the augmented reality image takes into account physical conditions in the environment that influence the visibility of the virtual object, including amorphous features such as smoke, fog or other environmental characteristics which may change over time.

Figure 1:
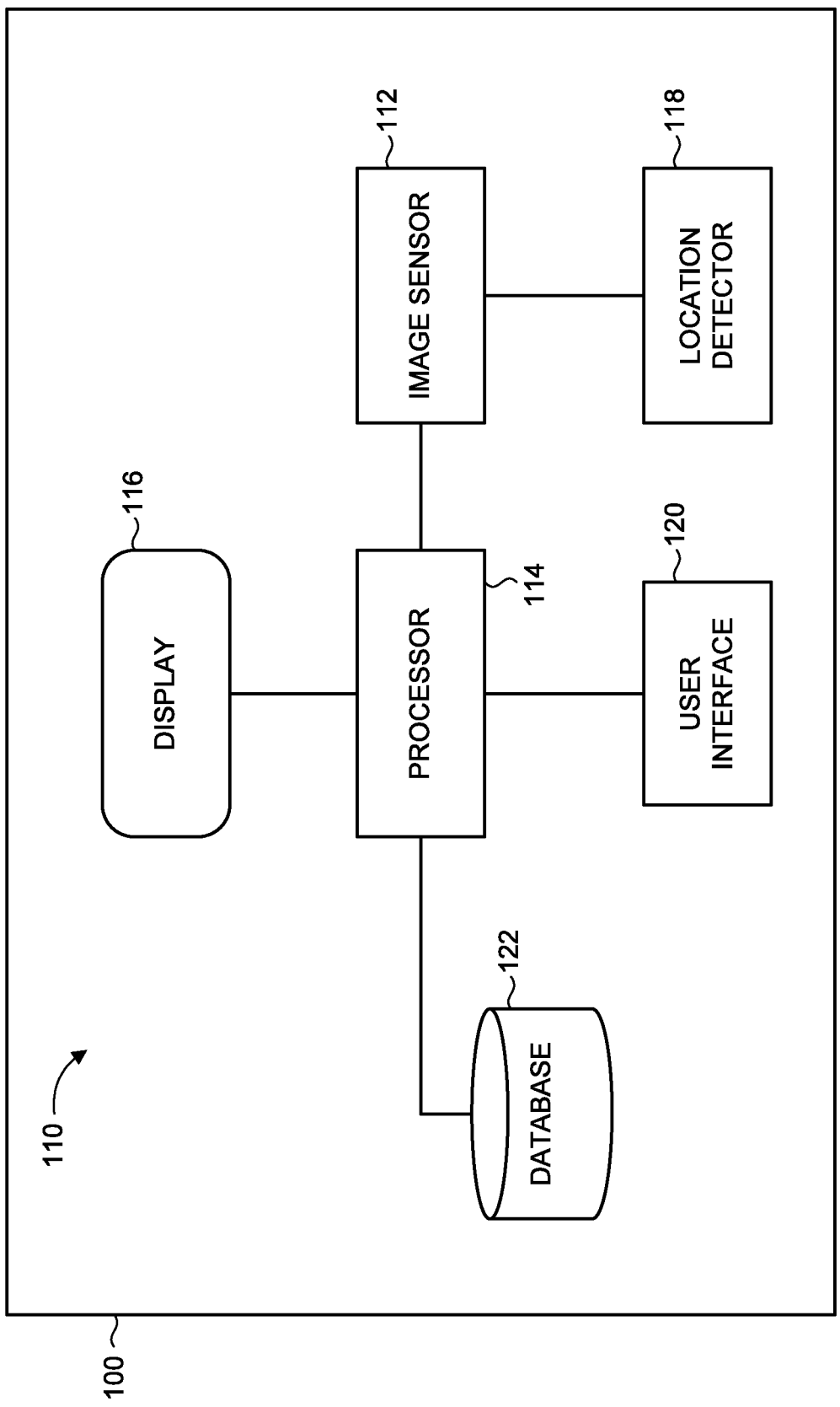
FIG. 1 is a schematic illustration of a system for displaying augmented reality reflective of environmental features affecting visibility, constructed and operative in accordance with an embodiment of the present invention.

Reference is now made to FIG. 1, which is a schematic illustration of a system, generally referenced 110, for displaying augmented reality reflective of environmental features affecting visibility, constructed and operative in accordance with an embodiment of the present invention. System 110 includes an image sensor 112, a processor 114, a display 116, a location detector 118, a user interface 120 and a database 122. Processor 114 is communicatively coupled with image sensor 112, with display 116, with location detector 118, with user interface 120, and with database 122. System 110 is generally installed on a platform, referenced 100, such as a vehicle or other moving platform, although some components may reside at a different location and may be accessible to processor 114 through a communication link. For example, system 110 may be implemented (at least partially) on an aircraft, an automobile, a motorcycle, a ship or marine vessel, and the like. System 110 may also be installed (at least partially) on a stationary platform. The term "user" herein refers to any person or group of persons operating the system or method of the present invention. For example, the user may be an aircraft pilot or other crew member, where the system is installed within the cockpit of an aircraft and representing a flight simulator.

Image sensor 112 captures an image of a scene in a real-world environment. Image sensor 112 may be any type of sensor device capable of acquiring an image representation of the scene, including the acquisition of any form of electromagnetic radiation at any range of wavelengths (including visible and non-visible wavelengths). For example, image sensor 112 may be a forward looking infrared (FLIR) camera or a charge-coupled device (CCD) image sensor. Image sensor 112 is operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital representation of a scene acquired at any spectral region, and encompasses both a single image frame and a sequence of image frames (i.e., a "video image").

Image sensor 112 may be mounted on platform 100, which may be in an indoor or outdoor environment. For example, image sensor 112 may be an outward facing image sensor mounted within an aircraft cockpit and operating at wavelengths that penetrate the cockpit windshield. Image sensor 112 may be aligned toward the general direction in which the user is facing, so as to image a scene in the field of view (FOV) of the user. System 110 may include multiple image sensors 112, such as a pair of image sensors for generating a stereoscopic image, or multiple sensors with different FOVs for imaging a wider overall FOV than would be possible with only a single image sensor.

Display 116 displays an image of the scene captured by image sensor 112. The displayed image may include supplementary image content, such as a virtual element graphic or symbol superimposed onto the background scene that appears in the image. Display 116 may be embodied by a fixed display, such as a head-up display (HUD) or a head-down display (HDD) integrated in vehicle platform 100, or by a head-mounted display (HMD) embedded within a wearable apparatus worn by the user. Display 116 may alternatively be a portable or hand-held display, such as a display screen of a mobile computing device. Display 116 may also be a see-through display which can present projected AR images superimposed onto a see-through view of the external environment.

User interface 120 allows the user to control various parameters or settings associated with the components of system 110. For example, user interface 120 can allow the user to provide instructions or select parameters associated with the displayed image. User interface 120 may include a cursor or touch-screen menu interface, such as a graphical user interface, configured to enable manual input of instructions or data. User interface 120 may also include communication devices configured to provide voice communication, such as a microphone and an audio speaker, as well as voice recognition capabilities to enable entering instructions or data by means of speech commands. User interface 120 may also enable the user to communicate with external sources, such as with other users (e.g., other flight simulation trainees) or with a remote operator (e.g., a flight simulation supervisor).

Location detector 118 provides an indication of the current position and orientation of image sensor 112. Location detector 118 may include one or more devices or instruments configured to measure the position and the orientation or viewing angle of image sensor 112 with respect to a reference coordinate system, such as: a global positioning system (GPS); a compass; an inertial navigation system (INS); an inertial measurement unit (IMU); motion sensors or rotational sensors (e.g., accelerometers, gyroscopes, magnetometers); a rangefinder; and the like. Location detector 118 may utilize the location of platform 100 on which image sensor 112 is situated as part of calculating the position and orientation of image sensor 112. Location detector 118 may further utilize a driving route or flight route of vehicle platform 100 (e.g., using a GPS or other onboard instruments), as well as other relevant real-time parameters of vehicle platform 100, such as velocity and acceleration, to allow the determination of an updated location over time.

Database 122 stores information relating to real-world environments, such as an environment where system 110 is located. The environmental information may include: weather or climate forecasts; a three-dimensional (3D) geographic model that includes a three-dimensional representation of the Earth or of a particular area, region or territory of interest; a digital terrain elevation map; and driving routes or flight routes of vehicle platform 100. Database 122 may also include supplementary image content associated with different landmarks or geographic locations, such as in the form of symbols, text, or other graphics, to be selectively displayed with relevant images.

Processor 114 receives instructions and data from the components of system 110. Processor 114 performs necessary image processing and generates a final image with superimposed virtual elements for displaying, as will be discussed further hereinbelow.

The components and devices of system 110 may be based in hardware, software, or combinations thereof. It is appreciated that the functionality associated with each of the devices or components of system 110 may be distributed among multiple devices or components, which may reside at a single location or at multiple locations. For example, the functionality associated with processor 114 may be distributed between multiple processing units (such as a dedicated image processor for the image processing functions). Processor 114 may be part of a server or a remote computer system accessible over a communications medium or network, or may be integrated with other components of system 110, such as incorporated with a computer associated with display 116. System 110 may optionally include and/or be associated with additional components not shown in FIG. 1, for enabling the implementation of the disclosed subject matter, such as a power supply (not shown) for providing power to various components, and a memory or storage unit (not shown) for temporary storage of images or other data.

The operation of system 110 will now be described in general terms, followed by specific examples. Processor 114 receives an image of a scene captured by image sensor 112. Processor 114 determines at least one virtual object to be superimposed onto the captured image, and determines characteristics relating to the virtual object, such as at least the intended location (position and orientation) of the virtual object in relation to the location (position and orientation) of image sensor 112 when the image was captured. Processor 114 further obtains environmental information, particularly information relating to the visibility conditions at the imaged scene and the different environmental features influencing visibility of the virtual object.

Visibility of an object is reflective of how the object would be perceived at that particular scene at the particular point in time at which the image is captured, when taking into account the various features present in the environment. For example, environmental features influencing visibility may include: sunlight or solar radiation; other light sources; clouds; fog; smoke; pollutants, or atmospheric particles; rain; snow; moisture or water particles; physical obstructions; and surfaces or elements that effect the characteristics of light propagating through an optical medium. Such environmental features may cause the object to be perceived with brightness or glare (e.g., sunlight), or appear blurry or hazy (e.g., fog or cloudiness), or distorted (e.g., atmospheric particles), or partially or completely blocked from view (e.g., physical obstructions). It is noted that the visibility of an object is influenced not only by individual environmental features, but also by the interactions between different features. For example, an object may include moisture or water droplets on its surface, which is perceived in a certain way due to the interaction of the sunlight with the water droplets, where, for example, the angle at which the sun rays are incident on the water droplets is a function of the position of the sun in the sky. The perception of the same object may in turn be further influenced by cloudiness or fogginess in the intermediate atmosphere, which has an additional interaction with the sunlight and the water droplets on the object.

Environmental features that affect visibility in a scene may be classified into "obstructing features" or "non-obstructing features". The term "obstructing feature" as used herein refers to a physical object or element that serves to completely block or obstruct the view of (at least a portion of) another object (real or virtual) positioned behind it, when viewed along a particular LOS. For example, if a person is standing behind a building or a vehicle, then a viewer on the other side of the building or vehicle would be unable to see that person at all (since he/she is completely obstructed from view), in which case the building or vehicle represents an "obstructing feature". In contrast, if an object in the scene is only partially obscured by one or more natural phenomena, such that the object is visible but with a modified appearance (e.g., appearing blurry or hazy or oversaturated or distorted), then the object is affected by at least one "non-obstructing feature". Examples of non-obstructing features that affect visibility include, but are not limited to: sunlight, shadows, wind, fog, smog, haze, smoke, rain, snow, sleet, an optical surface (e.g., a tinted window) or other element that influences the characteristics of light propagating through an optical medium, and the like. It is further noted that some environmental features that influence visibility may be considered "amorphous features", which do not have a fixed or defined shape or position, such as, for example, sunlight, fog, or rain. Accordingly, the term "amorphous feature" as used herein refers to any environmental feature whose shape (contours), size, and/or position may change over time. It is noted that an obstructing feature that influences visibility may be embodied by a non-amorphous obstructing feature (e.g., a fixed entity such as a building or vehicle) or an amorphous obstructing feature (e.g., an amorphous entity, such as a cloud, that completely obstructs the view of an object behind it), whereas a non-obstructing feature that influences visibility is typically an amorphous non-obstructing feature (e.g., fog, smoke, or water droplets that partially obscure or alter the appearance of an object behind it).

Based on the obtained information, processor 114 generates an augmented image for displaying, where the augmented image includes the virtual object superimposed onto the image captured by image sensor 112, such that the virtual object appears in a realistic manner reflective of visibility affecting features in the scene. In particular, the visual attributes of the virtual object as it appears in the augmented image is made to be consistent with the attributes of environmental features in the scene along the LOS between the virtual object and image sensor 112, such as when the image was captured (or during a period of time substantially close to when the image was captured). The obstructing features that influence visibility of the virtual object are considered and handled separately from the non-obstructing features, as will be elaborated upon further hereinbelow. Display 116 displays the augmented image with the superimposed virtual object having a realistic appearance. According to an embodiment of the present invention, the displayed image is a video image which is continuously updated to correspond to the current location of a moving vehicle 100 on which system 110 is mounted, such as in the context of a training simulation or arena generator.

According to another embodiment of the present invention, system 110 may display augmented reality information onto a display device capable of reflecting projected images while providing a user with a see-through view of a real-world environment, such as on an optical HMD or another see-through wearable display device, or on a see-through HUD. Thus, the virtual objects may be projected on a see-through display 116 overlaid onto the view of the external scene, rather than on an image captured by an image sensor 112.

Figure 2A:
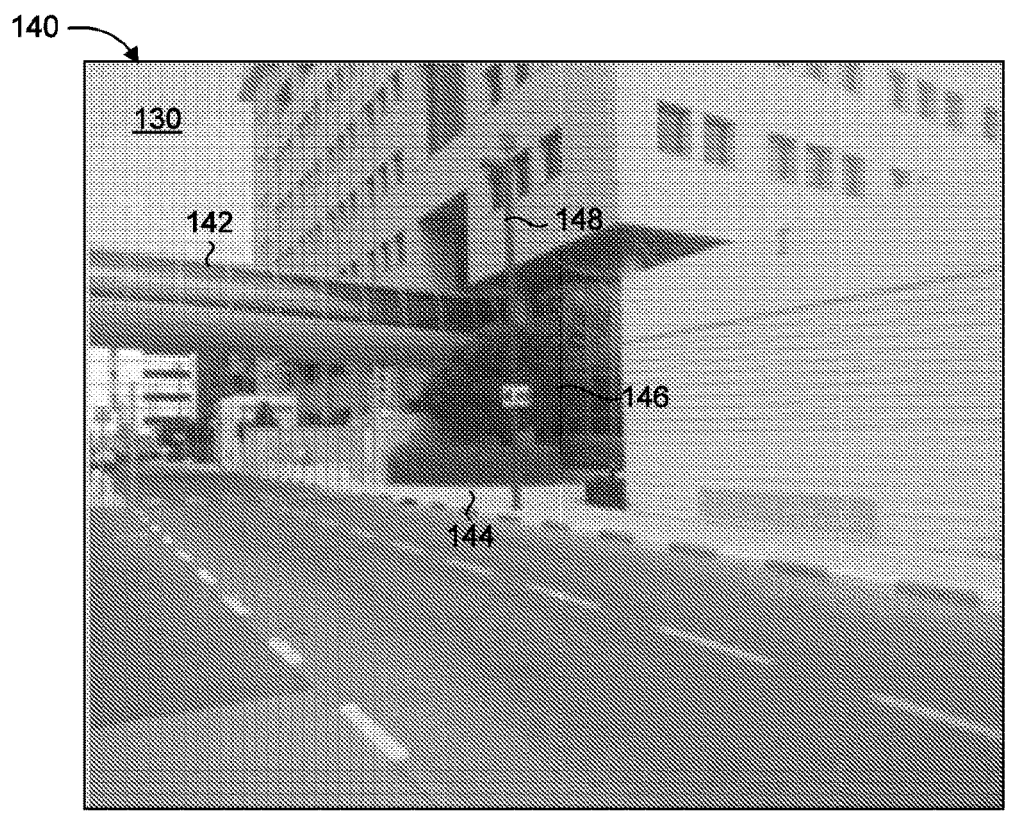
FIG. 2A is an exemplary image captured by the image sensor of FIG. 1, operative in accordance with an embodiment of the present invention.
Figure 2B:
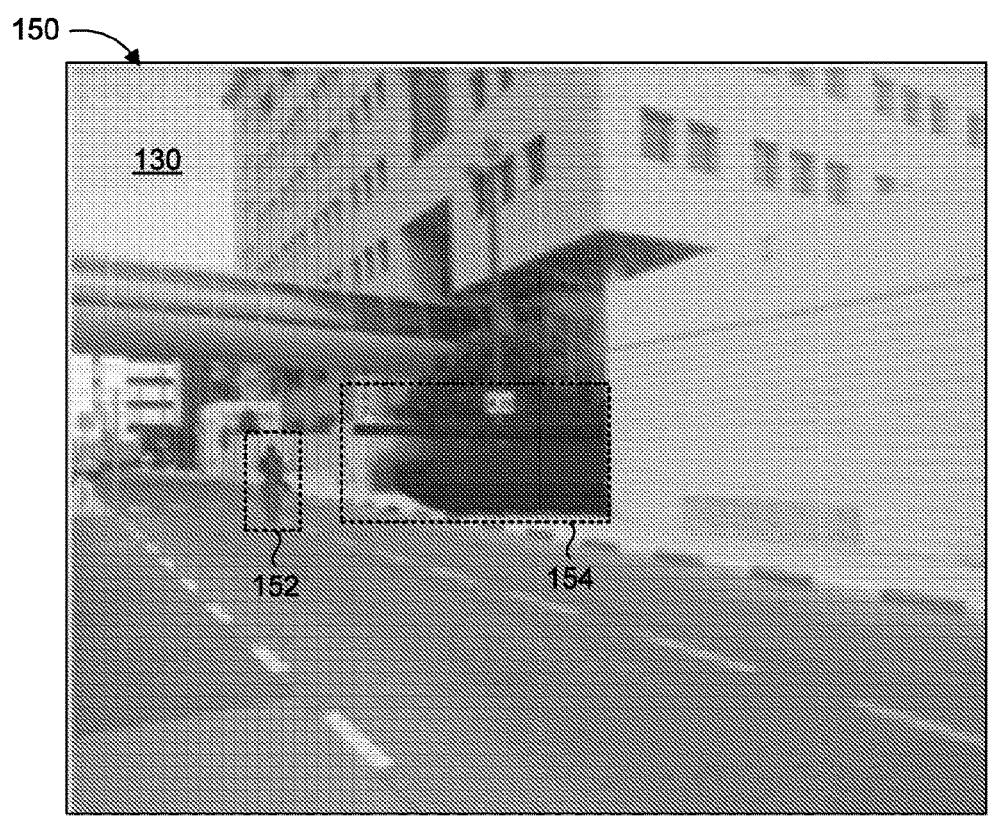
FIG. 2B is an exemplary augmented image generated from the image of FIG. 2A, operative in accordance with an embodiment of the present invention.

Reference is now made to FIGS. 2A and 2B. FIG. 2A is an exemplary image captured by the image sensor of FIG. 1, operative in accordance with an embodiment of the present invention. FIG. 2B is an exemplary augmented image generated from the image of FIG. 2A, operative in accordance with an embodiment of the present invention. Image sensor 112 captures an image 140 of a scene 130 (FIG. 2A). Processor 114 receives image 140 and determines that a virtual object representing a person and a virtual object representing a tank are to be superimposed onto image 140. Processor 114 determines the location in the imaged scene 130 at which the virtual person and virtual tank are to be superimposed. For example, processor 114 determines that the virtual person should appear standing on the road underneath the elevated walkway (referenced 142), and that the virtual tank should appear on the sidewalk (referenced 144) in between the tree (referenced 146) and the lamppost (referenced 148).

Processor 114 further detects the environmental features in scene 130 that would affect the visibility of the virtual person and the virtual tank, and determines the visibility effect caused by these environmental features. The information relating to the environmental features may be obtained by processing and analyzing captured image 140, and/or using external sources such as a 3D geographic model, a weather forecast or prediction model, or other relevant information, which may be stored in database 122. For example, processor 114 determines that there is significant cloudiness or haziness in scene 130 that influences visibility along the LOS to the intended position of the virtual person, and along the LOS to the intended position of the virtual tank. The degree of haziness may be quantified using a suitable metric, such as, for example, by determining a 40% level of haze along the virtual person LOS and a 30% level of haze along the virtual tank LOS (i.e., with respect to some fixed baseline). Processor 114 further determines that lamppost 148 in scene 130 acts as an obstruction along the LOS to the intended position of the virtual tank, and determines relevant attributes of lamppost 148 (e.g., range, contours or shape, size and dimensions, and the like) relating to the potential obstruction. It is appreciated that the cloudiness or haziness in scene 130 represents an amorphous (non-obstructing) feature affecting visibility of the intended virtual objects, while the lamppost 148 in scene 130 represents a non-amorphous feature affecting visibility (by potentially obstructing an intended virtual object).

Subsequently, processor 114 generates an augmented image 150 (FIG. 2B), in which a virtual person, referenced 152, and a virtual tank, referenced 154, are superimposed at respective locations and appearing reflective of the environmental features affecting their visibility. Virtual person 152 appears in augmented image 150 superimposed on the road underneath elevated walkway 142. The appearance of virtual person 152 is consistent with the level of haze along the viewing angle or LOS of image sensor 112 to the location of virtual person 152 in scene 130. Similarly, virtual tank 154 appears in augmented image 150 superimposed on the sidewalk between tree 146 and lamppost 148, where the appearance of virtual tank 152 is consistent with the visibility affecting features present along the viewing angle of image sensor 112 to the location of virtual tank 154 in scene 130. For example, virtual person 152 may appear somewhat blurry or fuzzy, or otherwise having reduced visibility, such as to reflect the "40% level of haze" determined to be present along the LOS to virtual person 152. Similarly, virtual tank 154 is also made to appear with reduced visibility, to reflect the "30% level of haze" determined to be present along the LOS to virtual tank 154. The aforementioned reductions in visibility may be exemplified as a modification in at least one visual attribute of the corresponding displayed virtual object, such as by modifying the: brightness, contrast, and/or color intensity of the virtual object. Thus, the visual clarity of virtual person 152 and of virtual tank 154 may be reduced in augmented image 150, for example by decreasing or increasing the brightness and/or contrast by selected amounts, so as to reflect their respective reduced visibility levels resulting from the respective levels of haze present relative to each. The clarity reduction may be achieved by applying a "blurriness filter" or other suitable image modification effect to the respective virtual object. The visual appearance applied to the virtual objects in augmented image 150 may also reflect the particular imaging capabilities of the image sensor 112 which captured the original image 140.

Furthermore, the appearance of virtual tank 154 in image 150 is also consistent with the obstructing features present along the LOS to the virtual tank 154 in scene 130. In particular, virtual tank 154 appears (partially) obstructed by lamppost 148. For example, virtual tank 154 may appear as if positioned behind lamppost 148, where an obstructed portion of virtual tank 154 is not visible in augmented image 150 (being blocked by the lamppost).

Display 116 displays the augmented image 150 to the user. The augmented image may also depict supplementary information associated with notable portions of the image, such as a text or graphic providing instructions or information relating to a selected virtual object or another feature that appears in the image. System 110 may also embed audio content relating to the training. For example, system 110 may monitor the real audio content relating to a training session and provide additional virtual audio. For example, a user may receive an audible notification such as: "TARGET HIT!" indicating that a selected virtual target that appears in augmented image 150 (or that appears elsewhere in scene 130 outside the FOV of image 150), was hit during the training session.

The determination of environmental features influencing visibility of the intended virtual objects, as well as the determination of the effect on visibility caused by such features, may be performed based on image processing and/or based on stored data or external data sources. For example, the real image of the scene captured by sensor 112 can be compared with a default view of the scene under ideal conditions (e.g., under optimal visibility conditions), using the known position and orientation of sensor 112, to reveal how the appearance of an existing object (common to both images) is influenced by the prevailing environmental features. The captured image may be compared with previous images of the scene (e.g., stored in database 122) and/or terrain data (e.g., obtained from a digital terrain model (DTM)) to provide an indication of the changes in appearance of static or constant objects in the terrain (e.g., trees, mountains, buildings, monuments, and the like). In addition, the changes in appearance of dynamic objects, i.e., objects which may appear in the imaged scene momentarily, such as a vehicle passing by, may also be determined by extrapolating from the appearance changes of other (static) objects in the scene. The effect of the environmental features may also be determined by examining the spectral properties or histograms of the captured image, in conjunction with weather or climate information of the scene (e.g., obtained using sensor 112 and/or a weather/climate data source and/or manual input). One relevant factor affecting visibility is the shadows arising from topographical features. For example, if a virtual object is located in an area on which a shadow is cast by a mountain or other landform, the visibility of the virtual object would be significantly impacted by such a shadow. A topographical map of the imaged scene may be obtained from external sources (e.g., a DTM) and can be used, along with the known relative location of light sources in the scene (e.g., the sun), to determine the regions on which a shadow will be cast, and consequently how such shadows influence visibility in these regions. The effect of shadows cast by new elements in the scene (i.e., objects or terrain features that may not appear in stored images or 3D models of the scene) may also be established, such as based on the shadow effects caused by other elements.

A further approach is to employ a machine learning process or algorithm (e.g., using a neural network algorithm or regression model) to gradually learn the manner in which environmental features affect visibility, such as by offline processing sets of exemplary images that include various objects in different environmental conditions (e.g., degrees of ambient lighting, sunlight, and other visibility features). For example, the virtual object may appear to resemble a first color when in low lighting and a second color in bright lighting. After processing a sufficient number of data sets, a machine learning algorithm may be capable of characterizing the appearance and visual properties of an object under various environmental conditions and visibility affecting features. This may also be supplemented by a manual calibration process, such as by adding a real object next to the virtual object and adjusting the visual properties of the virtual object until it matches the appearance of the real one.

Information relating to visibility affecting features obtained from different sources may be assigned different relative weights. For example, processor 114 may determine a first set of attributes of environmental features affecting visibility by processing captured image 140, and determine a second set of attributes of environmental features affecting visibility by processing one or more previously captured images of scene 130 or other information obtained from database 122 (e.g., a 3D geographic model). Processor 114 may assign a differential weighting or qualitative value to each set of attributes (e.g., 70% for the current image and 30% for the previous images), and determines a final set of attributes accordingly. The weighting scheme for each determination may be adaptive, such as being updated based on real-time information (e.g., increasing the qualitative value of the current image 140 relative to other data sources if a higher resolution image sensor 112 is utilized to capture image 140) or historical analysis (e.g., determining the success rate of previous determination of attributes using suitable metrics). Processor 114 may additionally modify the determined environmental features and/or their attributes using relevant supplementary information, such as ambient light information obtained using a separate ambient light sensor (not shown). For example, processor 114 may initially determine that the level of haze (along a LOS to a selected virtual object location) is quantifiable as 20%, but after taking into account the ambient light in scene 130 (as determined with a separate sensor or other sources), the haze level is modified to 15%, i.e., so as to more accurately reflect the perception of the object in scene. For example, a scene having a particular haze level may be perceived differently by a viewer during the early morning than would be perceived during midday or during the evening, due to the differing levels of ambient light in the scene present at different times of day (among other factors and interactions in the environment). Thus, an image of that scene captured during the early morning may be characterized with a higher effective visibility level than a corresponding image of the same scene with the same environmental features that was captured during the evening. Accordingly, a virtual object may appear differently in different augmented images with similar environmental features, depending on the time of day or the ambient lighting present when the images were captured.

Different visual attributes of a virtual object may be adjusted or modified in various ways so as to reflect a perception of that virtual object resulting from visibility affecting environmental features in the scene. Examples of adjustable parameters and visual modifications include but are not limited to: brightness; intensity; color; transparency; clarity; contrast; and combinations thereof. For example, a virtual object may be displayed in a partially opaque or semi-transparent visual form, so as to reflect a reduction in visibility of that object as it would be perceived in the imaged scene under the relevant environmental conditions.

It is noted that the augmented image may further be displayed to account for the particular form of the captured image and/or the type of image sensor 112 that captured the image. For example, display 116 is adapted to display an augmented infrared (IR) image to conform with an IR image captured by a FLIR camera 112, where the appearance of the virtual object further reflects the perception of that object in an IR image as opposed to a non-IR image. For example, if it is determined that the visual clarity of a virtual object should be reduced to reflect a 30% reduction of visibility as would be perceived by a viewer due to environmental features in the scene, then an image captured in the visible spectrum may depict the virtual object with a 30% reduction in brightness or contrast (and/or other visual attribute), while a corresponding IR image may depict the same virtual object with only a 20% reduction in brightness or contrast (and/or other visual attribute), so as to account for the further degradation in perception resulting from the IR image format. Processor 114 may take into account the type of image sensor when determining the appearance of the virtual objects in the augmented image. For example, processor 114 obtains an indication of relevant characteristics of image sensor 112, and factors this information when modeling the visual adjustments required in view of the visibility influencing features in the scene. For example, a first image modelling process would be applied to reflect a given set of visibility influencing features for an image captured by an IR camera, whereas a second (different) image modelling process would be applied to reflect the same set of visibility influencing features for an image captured by a non-IR camera.

It will be appreciated that the present invention may provide the viewer with a more realistic perception of virtual objects in a scene, as the virtual object appears how it would be perceived if it were a real object located in the scene under the prevailing environmental conditions. Thus, the perception and comprehension of the virtual objects in relation to the actual physical environment may be enhanced, thereby providing a more realistic training experience. By enabling the display of a real environment, as captured by the sensor or viewed directly by the trainee, and augmented with virtual (instead of real) objects behaving according to a high quality simulation and displayed in a realistic manner, the training session can reduce expenses and resources and furthermore can conduct simulations of particular scenarios or environments that would otherwise be difficult or problematic to simulate, such as, for example, urban warfare with live combat.

Figure 3B:
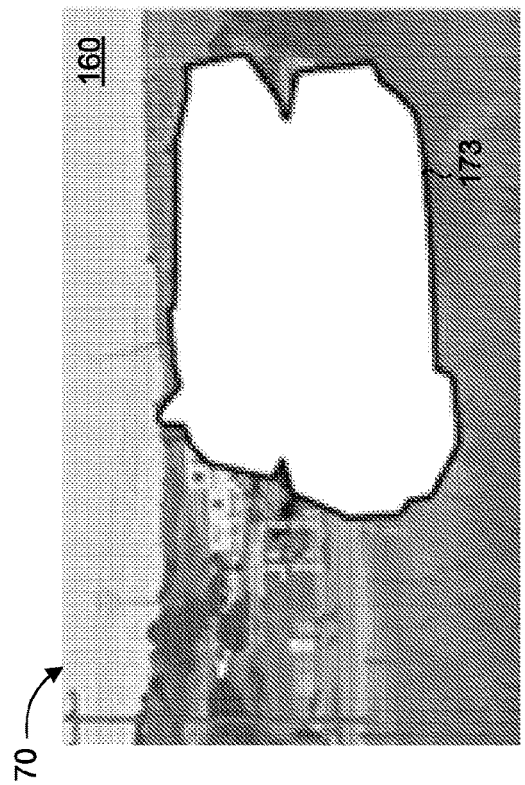
FIG. 3B is an exemplary image depicting the contour of the obstructing feature in the image of FIG. 3A, operative in accordance with an embodiment of the present invention.
Figure 3A:
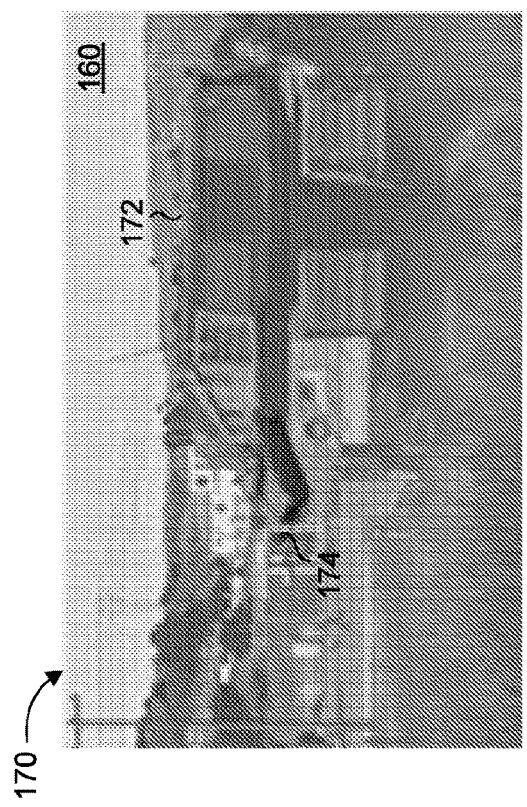
FIG. 3A is an exemplary initial augmented image with a superimposed virtual object in a scene with an obstructing feature, operative in accordance with an embodiment of the present invention.
Figure 3C:
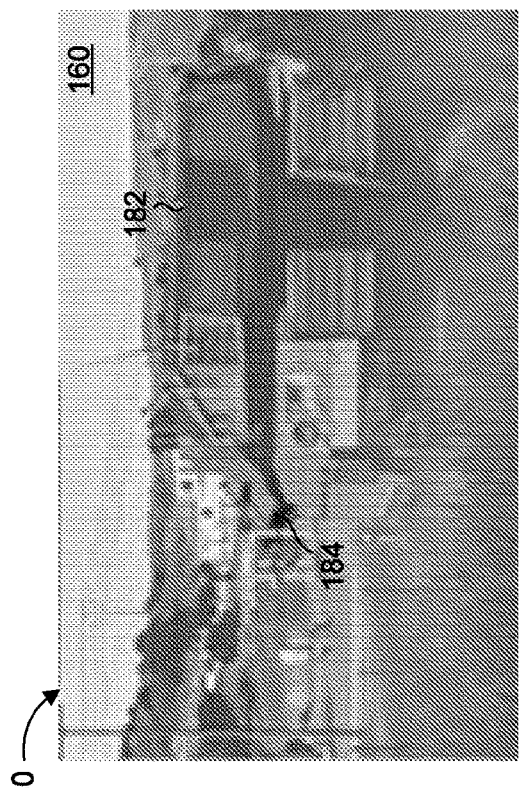
FIG. 3C is an exemplary updated augmented image of FIG. 3A with a modified appearance of the superimposed virtual object, operative in accordance with an embodiment of the present invention.

Reference is now made to FIGS. 3A, 3B and 3C. FIG. 3A is an exemplary initial augmented image with a superimposed virtual object in a scene with an obstructing feature, operative in accordance with an embodiment of the present invention. FIG. 3B is an exemplary image depicting the contour of the obstructing feature in the image of FIG. 3A, operative in accordance with an embodiment of the present invention. FIG. 3C is an exemplary updated augmented image of FIG. 3A with a modified appearance of the superimposed virtual object, operative in accordance with an embodiment of the present invention.

System 110 (FIG. 1) determines the characteristics of a virtual object to be displayed onto a view of a scene 160. In particular, system 110 determines that a virtual tank should be displayed on an image of scene 160, and determines various characteristics of the virtual tank, such as the size and shape, type of tank, and visual attributes (e.g., color and brightness), as well as its location in scene 160, such as in accordance with the requirements of a training session taking place. It is appreciated that the "location of the virtual object", and grammatical variations thereof, as used herein, should be interpreted broadly, and should not be considered limited to, for example, a determination of the "real-world geographic coordinates" of the virtual object. For example, system 110 may merely determine where the virtual object should appear in relation to other objects present in scene 160. Furthermore, the location of the virtual object may represent a location where the virtual object is already displayed, or where the virtual object is intended to be displayed at a future time. Accordingly, the displaying of the virtual object may occur at any point in time, such as before and/or after the determination of the virtual object characteristics.

System 110 generates an initial augmented image 170 (FIG. 3A) that includes a real tank, referenced 172, present in scene 160, as well as a virtual tank, referenced 174, superimposed onto scene 160 at the determined location. System 110 determines environmental features at scene 160 that affect the visibility of virtual tank 174. In particular, processor 114 determines that real tank 172 represents an obstructing environmental feature, as real tank 172 partially obstructs the view of virtual tank 174 when viewed along the LOS from the scene origin (i.e., image sensor 112 or the eyes of the viewer of a see-through display) to the location of virtual tank 172 in scene 160.

Processor 114 proceeds to determine the attributes of real tank 172 using relevant data sources. In particular, processor 114 determines the range of real tank 172 relative to image sensor 112, as well as the contours (e.g., size and shape) of real tank 172. It should be noted that the "range" of an object in the scene, as used herein, generally refers to the distance from the scene origin (i.e., the image sensor or the eyes of a viewer of a see-through display) and an object (e.g., a virtual object); whereas the terms "position" or "location" are generally used herein to refer to the position or location of the object in the scene (such as in terms of real-world coordinates or in relation to other objects in the scene). The range and contour attributes may be determined by processing image 170. FIG. 3B depicts the contours of real tank 172, referenced 173, as detected by processor 114 in image 170. Based on the determined attributes of real tank 172 (e.g., the detected contours 173, and the determined position or range), and the intended location of virtual tank 174, processor 114 determines which, if any, portions of virtual tank 174 would appear obstructed from view (i.e., when viewed along the LOS of image sensor 112 when image 170 was captured). In particular, processor 114 determines whether the virtual tank 174 is positioned in front of (i.e., before) or behind (i.e., after) real tank 172 by comparing the determined ranges of each, thereby indicating whether the virtual object is in fact obstructed. If (the entirety of) virtual tank 174 is determined to be in front of real tank 172, then there is no obstruction. However, if (at least part of) virtual tank 174 is behind real tank 172, then there is an obstruction. Processor 114 then determines precisely which parts of virtual tank 174 are obstructed based on the contours 173 of real tank 172.

Processor 114 then generates an updated augmented image, referenced 180 (FIG. 3C), in which the virtual tank, referenced 184, appears partially obstructed by the real tank, referenced 182, in scene 160, in accordance with the previously determined obstruction attributes. Thus, virtual tank 184 may appear in image 180 as if positioned partially behind real tank 182, consistent with the appearance of such a virtual tank located at that position, were it to be viewed by an observer present in the physical scene, from the viewpoint at which image sensor 112 was aligned when capturing image 170.

Figure 4A:
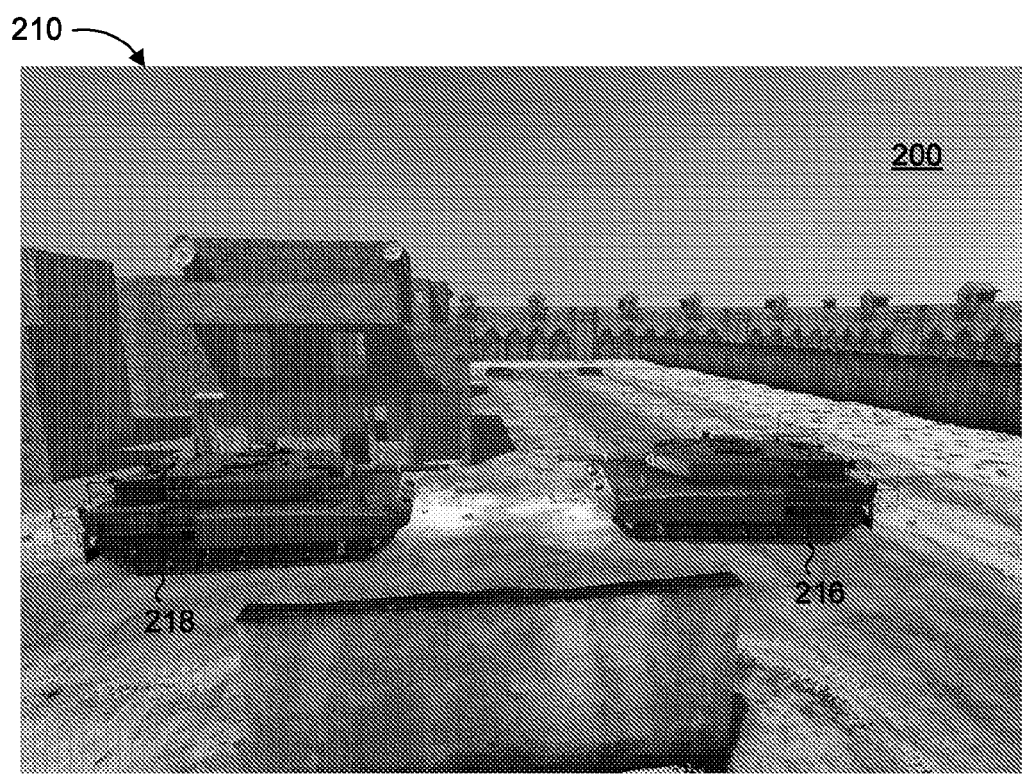
FIG. 4A is an exemplary augmented view of a first scene during a first set of environmental conditions, operative in accordance with an embodiment of the present invention.
Figure 4B:
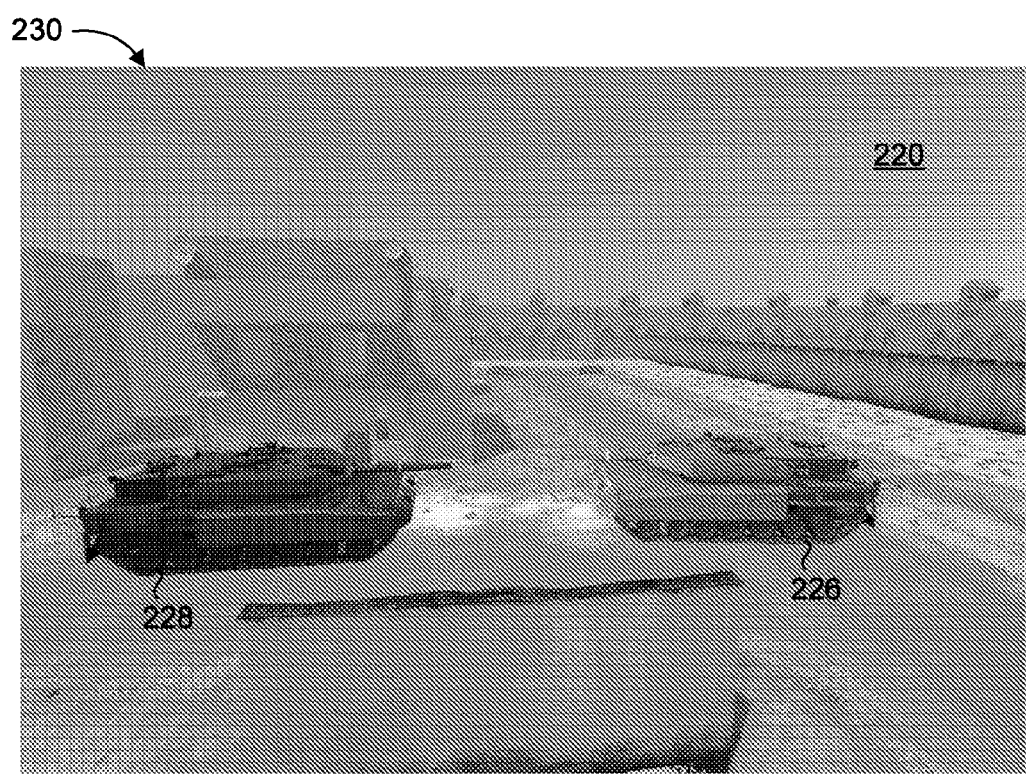
FIG. 4B is an exemplary augmented view of a second scene during a second set of environmental conditions, operative in accordance with an embodiment of the present invention.

Reference is now made to FIGS. 4A and 4B. FIG. 4A is an exemplary augmented view, generally referenced 210, of a first scene during a first set of environmental conditions, operative in accordance with an embodiment of the present invention. FIG. 4B is an exemplary augmented view, generally referenced 230, of a second scene during a second set of environmental conditions, operative in accordance with an embodiment of the present invention. Augmented view 210 (FIG. 4A) represents a view of a scene during a first set of environmental conditions, referenced scene 200, such as based on a captured image or as viewed by an observer of a see-through display. Augmented view 210 includes a real tank 216 present in scene 200 and a virtual tank 218 superimposed onto scene 200. Augmented view 230 (FIG. 4B) represents a view of the same scene but at different environmental conditions, referenced scene 220, which also includes a real tank 226 present in scene 220 and a virtual tank 228 superimposed onto scene 220. For each of augmented views 210, 230, system 110 detects the environmental features affecting visibility at the respective scene 200, 220, and modifies the appearance of virtual tank 218 accordingly. For example, the ambient lighting of scene 200 may be considered relatively moderate (e.g., during early morning or late afternoon with little sunlight) and/or there may be a relatively low degree of smog or atmospheric particulates that would affect visibility. Therefore, system 110 modifies the appearance of virtual tank 218 to resemble that of real tank 216, and to appear reflective of the visibility affecting features in the environment of scene 200. In particular, the visual attributes of virtual tank 218 (e.g., brightness, contrast, color) may be adapted to reflect the relative moderate ambient lighting/low smog present in scene 200. As a result, both virtual tank 218 and real tank 216 appear in a realistic manner in augmented view 210.

In contrast, the ambient lighting of scene 220 may be relatively bright (e.g., during midday with substantial sunlight) and/or there may be a relatively high degree of smog or atmospheric particulates that would affect visibility. Therefore, system 110 would need to modify the appearance of virtual tank 228 in augmented view 230 (such as by adapting the brightness/contrast/color to provide a saturated or faded appearance), so that virtual tank 228 would appear similar to real tank 226, reflective of the environmental conditions of scene 220 (e.g., relative bright ambient lighting/high smog). Augmented view 230 depicts virtual tank 228 before its appearance has been modified to reflect the environmental conditions of scene 220, so that virtual tank 228 appears significantly different than real tank 226 in augmented view 230. Thus, the requisite visual modifications of the same virtual object may differ substantially for the same scene captured (or viewed) under different environmental conditions. It is also noted that the non-obstructing features affecting visibility in a scene may be continuously moving and changing form, i.e., they may be amorphous features, and thus the visual modifications required for a given virtual objects may need to be continuously updated, even over short periods of time, in order to reflect such continuous movements and changes.

Figure 5:
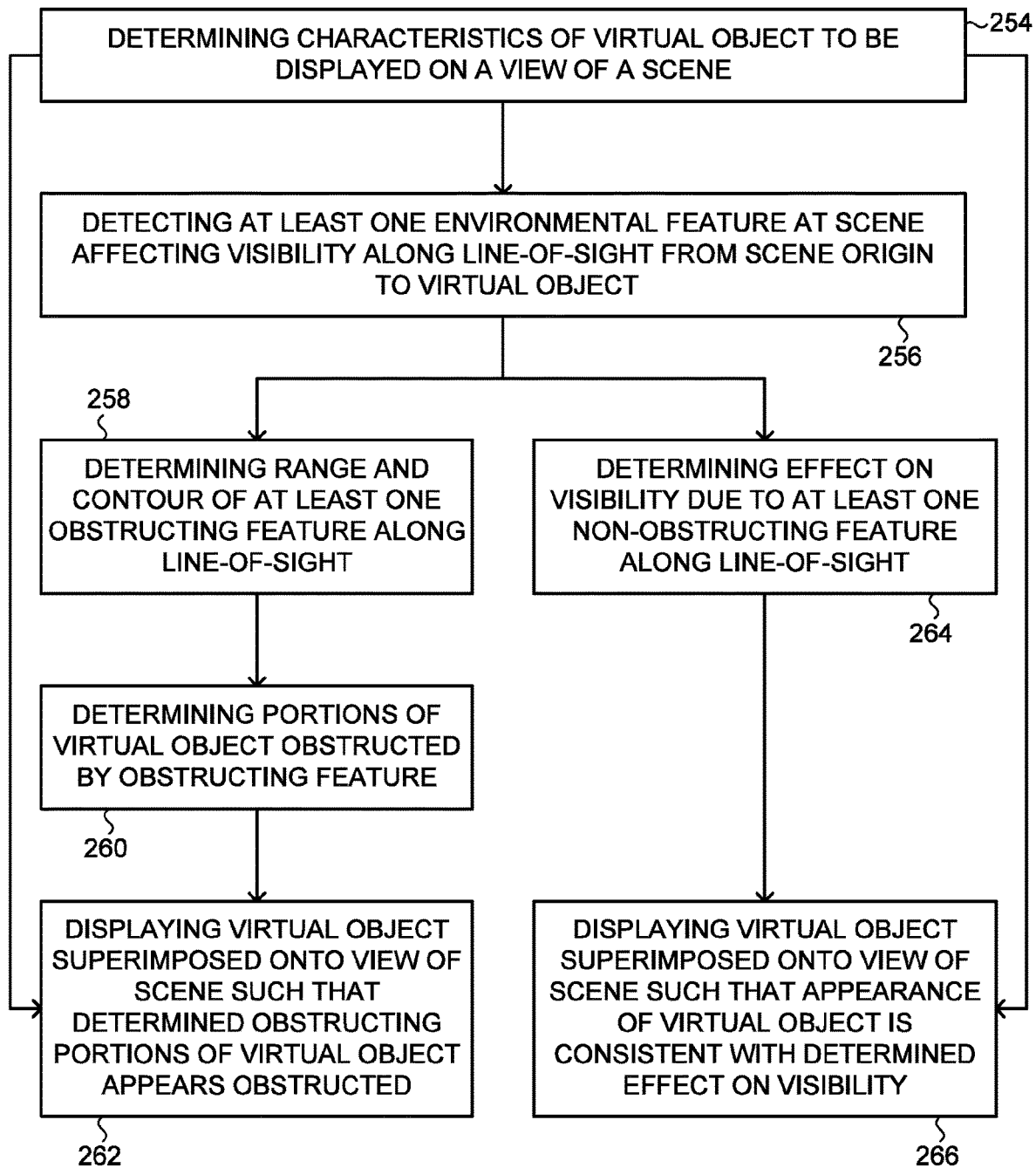
FIG. 5 is a block diagram of a method for displaying augmented reality reflective of environmental features affecting visibility, operative in accordance with an embodiment of the present invention.

Reference is now made to FIG. 5, which is a block diagram of a method for displaying augmented reality reflective of environmental features affecting visibility, operative in accordance with an embodiment of the present invention. In procedure 254, characteristics of at least one virtual object to be displayed on a view of a scene is determined. The view of the scene is obtained from a "scene origin", which may be, for example, an image sensor (if the virtual object is to be superimposed on a captured image), or the eyes of a viewer (if the virtual object is to be superimposed onto a see-through display). Referring to FIGS. 1 and 2A, processor 114 determines that virtual objects representing a person and a tank, respectively, are to be superimposed onto an image 140 of scene 130. Processor 114 determines relevant characteristics of the intended virtual objects, such as their size and shape, category or classification (e.g., type of person or type of tank), and visual attributes (e.g., lighting attributes, color attributes, texture or other features), as well as their locations in scene 130 (i.e., the position and orientation of the intended virtual objects with respect to the position and orientation of image sensor 112 when image 140 was captured). For example, processor 114 determines that the virtual person should appear standing on the road underneath elevated walkway 142, and that the virtual tank should appear on the sidewalk 144 in between tree 146 and lamppost 148. The virtual objects may alternatively be projected on a see-through display 116 overlaid onto the view of scene 130, rather than on an image 140. The location of the virtual object in the scene may represent a location where the virtual object is already displayed, or where the virtual object is intended to be displayed at a future time.

In procedure 256, at least one environmental feature at the scene affecting visibility along a line of sight from the scene origin to the virtual object is detected. Referring to FIGS. 1 and 2A, processor 114 determines that haze in scene 130 represents a non-obstructing environmental feature that influences the visibility of the virtual person and the virtual tank, at their respective locations in scene 130, when considered from the viewing angle (LOS) of the scene origin (image sensor 112, or the eyes of the viewer of a see-through display). Processor 114 further determines that lamppost 148 in scene 130 represents an obstructing environmental feature that may obstruct the view of the virtual tank. Processor 114 may detect the environmental features affecting visibility of the virtual objects by processing image 140 and/or using relevant data sources, such as: one or more sensors, a geographic information source (e.g., a digital elevation map or 3D geographic model), a prediction model (e.g., a weather/climate forecast), ambient lighting information, and/or manual input from a user.

The environmental features at the scene affecting visibility of the virtual objects are classified into "obstructing features" and "non-obstructing features". Obstructing features may be amorphous (i.e., an "amorphous obstructing feature") or non-amorphous (i.e., a "non-amorphous obstructing feature"). In procedure 258, the range and the contour of at least one obstructing feature affecting visibility along the LOS is determined. The range of the obstructing feature represents the distance along the LOS from the scene origin to the obstructing feature. Referring to FIGS. 1 and 2A, processor 114 determines the range and the contour of lamppost 148, which represents a potential obstruction of the virtual tank in scene 130. Referring to FIGS. 1 and 3A, processor 114 determines the range and the contour of tank 172, which represents a potential obstruction of virtual tank 174 in scene 160. The range and contours of the obstructing feature can be determined using image processing techniques and/or using information obtained from relevant data sources.

In procedure 260, the portions of the virtual object obstructed by the obstructing feature is determined. An obstruction of the virtual object is determined based on whether the range to the virtual object (along the LOS from the scene origin) is greater than or less than the range to the obstructing feature (along the LOS to the scene origin). In particular, the virtual object is considered to be obstructed if positioned behind the obstructing feature, where the range to the virtual object is greater than the range to the obstructing feature. Conversely, if the virtual object is positioned in front of the obstructing feature, where the range to the virtual object is less than the range to the obstructing feature, than the virtual object is not obstructed. If an obstruction is deemed to exist, then the obstructed portions of the virtual object are determined based on the contours of the obstructing feature in relation to the virtual object.

Referring to FIGS. 1 and 2A, processor 114 considers the (intended) position of the virtual tank and the determined range of lamppost 148 in scene 130, and determines that the virtual tank is positioned behind lamppost 148, and thus is (at least partially) obstructed by lamppost 148. Processor 114 further determines the obstructed portions of the virtual tank, based on the determined contours of lamppost 148. Referring to FIGS. 1 and 3A, processor 114 determines that virtual tank 174 is positioned behind real tank 172 in scene 160, and is thus obstructed by real tank 172, based on the determined range of real tank 172 in relation to the intended position of virtual tank 174. Processor 114 further determines the obstructed portions of virtual tank 174, based on the determined contours 173 of real tank 172.

The manner in which an obstruction is determined may depend on the characteristics of the obstructing feature. If the obstructing feature is determined to not be at ground level, then the difference between the range of the virtual object and the range of the obstructing feature (along the LOS from the scene origin) may be determined based on the relative angle from the virtual object to the obstructing feature over successive image frames, or based on a manual designation of the feature position. The determined difference may be adjusted, if necessary, according to the wind parameters. For example, referring to FIGS. 2A and 2B, assuming that the lamppost 148 in scene 130 was not at ground level, processor 114 may determine whether the range (intended location) of virtual tank 154 is greater or less than the range of lamppost 148 via image processing, such as by calculating the relative angle between virtual tank 154 and lamppost 148 over successive image frames (e.g., using triangulation or distance calculation techniques known in the art). The image processing may utilize a sequence of images of scene 130 captured by a single image sensor 112, or utilizing images obtained from multiple sources (e.g., by comparing images captured by different image sensors). Alternatively, the distance may be determined by a user of system 110 manually designating the parameters of the lamppost 148 in scene 130 via user interface 120. For example, the user may indicate the location of the lamppost 148 using a pointing device to denote the position of the lamppost 148 relative to the intended location of virtual tank 154 on a graphical user interface displaying image 140. Processor 114 may further utilize external data sources, such as a 3D geographic model of scene 130, to obtain information to assist with determining the distance between lamppost 148 and the intended location of virtual tank 154. Processor 114 may further obtain wind parameters relating to the wind in scene 130, such as the wind speed and wind direction at the time that image 140 was captured. Processor 114 may adjust the distance determined between lamppost 148 and the intended location of virtual tank 154, if the wind parameters meet certain criteria, such as if the wind speed exceeds a predetermined threshold.

If the obstructing feature is determined to be (at least partially and at least for some period of time) in contact with the ground, then the difference between the range of the virtual object and the range of the obstructing feature (along the LOS from the scene origin) may be determined by identifying a contact point of the feature with the ground, determining the range of the contact point (along the LOS of the scene origin), and tracking the position of the feature when the ground is not visible in subsequent image frames. For example, referring to FIGS. 2A and 2B, and assuming that at least part of lamppost 148 in scene 130 is in contact with the ground, processor 114 may determine whether the range (intended location) of virtual tank 154 is greater or less than the range of lamppost 148 by identifying at least one contact point of lamppost 148 with the ground surface, and determining the range of the contact point(s). The contact point range may be determined via image processing techniques known in the art, and/or based on information obtained from external data sources or a manual designation of the contact point by a user. If the ground is not visible in subsequent image frames, then processor 114 may track the location of lamppost 148 over successive frames, using image processing and object tracking techniques known in the art.

In procedure 262, the virtual object is displayed superimposed onto a view of the scene such that the determined obstructing portions of the virtual object appears obstructed in the displayed view. Referring to FIGS. 1, 2A and 2B, processor 114 generates augmented image 150 which depicts virtual tank 154 superimposed at its intended location in scene 130 (i.e., on sidewalk 144 in between tree 146 and lamppost 148), where virtual tank 154 appears partially obstructed by lamppost 148 such that the obstructed part of virtual tank 154 is not visible in image 150.

In procedure 264, the effect on visibility due to at least one non-obstructing feature affecting visibility along the LOS is determined. Referring to FIGS. 1 and 2A, processor 114 determines the relative effects caused by the haze in scene 130, determining that there is a 40% level of haze in relation to the intended location of the virtual person and a 30% level of haze in relation to the intended location of the virtual tank (when viewed along a LOS from image sensor 112 or from the eyes of a viewer of a see-through display 116). When multiple non-obstructing features are present along the LOS, processor 114 determines the effect on visibility resulting from the interactions among the accumulated non-obstructing features present. The effect on visibility caused by non-obstructing features can be determined using image processing techniques and/or using information obtained from relevant data sources. For example, processor 114 may compare the captured image with a previous image of the scene, such as under optimal visibility conditions, to obtain an indication of how objects in the scene appear in each scenario. The spectral properties or histograms of the captured image may also be examined in conjunction with weather or climate information. A topographical map may provide relevant information pertaining to terrain features in the scene, such as for determining the effect of shadows cast by such terrain features. A machine learning process may be applied to sets of images in different environmental conditions, in order to deduce the effect of such conditions and environmental features on the visual appearance of different objects.

In procedure 266, the virtual object is displayed superimposed onto a view of the scene such that the appearance of the virtual object is consistent with the determined effect on visibility. Referring to FIGS. 1, 2A and 2B, processor 114 generates augmented image 150 which depicts virtual person 152 superimposed at its intended location in scene 130 (i.e., standing on the road underneath elevated walkway 142) and virtual tank 154 superimposed at its intended location in scene 130 (i.e., on sidewalk 144 in between tree 146 and lamppost 148). The appearance of virtual person 152 and of virtual tank 154 reflects the various non-obstructing visibility affecting environmental features present in scene 130. In particular, virtual person 152 may appear blurry or fuzzy, such as by modifying the brightness, contrast and/or color intensity thereof, in a manner that reflects the 40% level of haze in scene 130 respective of virtual person 152. Virtual tank 154 may also appear blurry or fuzzy by similarly modifying at least one visual attribute thereof in a manner that reflects the 30% level of haze in scene 130 respective of virtual tank 154.

The method of FIG. 5 is generally implemented in an iterative manner, such that at least some of the procedures are performed repeatedly and/or continuously, in order to maintain the display of an augmented image of a scene for at least a selected duration (e.g., over a sequence of image frames). For example, if image sensor 112 is situated on a moving platform 100, then the displayed image remains linked to the changing line-of-sight of image sensor 112 resulting from the changing location of platform 100.

It is further noted that the method of the present invention may be implemented in an alternative order or sequence than described hereinabove, where the order of steps should not be construed as limiting. For example, procedure 256 (detecting environmental features at scene affecting visibility along LOS from scene origin to virtual object) may alternatively be implemented prior to procedure 254 (determining characteristics of virtual object to be displayed). For example, a preliminary scan of a scene of interest (e.g., a training arena) may be performed initially, providing an indication of visibility affecting features in the scene, which may be used at a later time, such as during a future simulation training event. Accordingly, the information relating to the visibility affecting features may be obtained before it is known which virtual objects are to be displayed.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for displaying augmented reality reflective of environmental features affecting visibility, the method comprising the procedures of:
   determining characteristics of at least one virtual object to be displayed on a view of a scene;
   detecting at least one visibility affecting environmental feature at the scene present along a line-of-sight (LOS) between the scene origin to the virtual object;
   when the detected feature comprises a non-obstructing feature, determining the effect on visibility due to the non-obstructing feature present along the LOS between the scene origin to the virtual object, and displaying the virtual object superimposed onto a view of the scene such that the appearance of the virtual object in the displayed view is consistent with the determined effect on visibility as perceived from the scene origin; and
   when the detected feature comprises an amorphous obstructing feature continuously moving and changing form, determining the range and the contour of the amorphous obstructing feature, determining obstructed portions of the virtual object based on the difference between the range of the virtual object and the range of the amorphous obstructing feature and based on the contour of the amorphous obstructing feature in relation to the virtual object, and displaying the virtual object superimposed onto a view of the scene such that the determined obstructed portions of the virtual object appear obstructed in the displayed view.

2. The method of claim 1, wherein the virtual object is displayed on an image of the scene.

3. The method of claim 1, wherein the virtual object is displayed on a see-through display overlaid onto a view of the scene.

4. The method of claim 1, wherein the non-obstructing feature comprising an amorphous non-obstructing feature.

5. The method of claim 1, wherein the virtual object is displayed with at least one visual attribute modified.

6. The method of claim 5, wherein the visual attribute is selected from the group consisting of:
   brightness;
   contrast; and
   color intensity.

7. The method of claim 1, wherein the environmental feature at the scene or the effect on visibility is determined using at least one source selected from the group consisting of:
   image processing;
   a comparison of different images of the scene;
   an examination of spectral properties of at least one image of the scene;
   information relating to the scene obtained from at least one sensor;
   a geographic information source;
   a weather/climate information source;
   a digital terrain model;
   a prediction model;
   a machine learning process; and
   a manual indication.

8. The method of claim 1, wherein determining the effect on visibility due to the non-obstructing feature comprises determining the effect of shadows in the scene, based on detected shadow casting elements and the relative location of at least one light source in the scene.

9. A system for displaying augmented reality reflective of environmental features affecting visibility, the system comprising:
   a processor, configured to determine characteristics of at least one virtual object to be displayed on a view of a scene, and to detect at least one visibility affecting environmental feature at the scene present along a LOS between the scene origin to the virtual object, and when the detected feature comprises a non-obstructing feature, the processor is further configured to determine the effect on visibility due to the non-obstructing feature present along the LOS between the scene origin to the virtual object, and when the detected feature comprises an amorphous obstructing feature continuously moving and changing form, the processor is further configured to determine the range and the contour of the amorphous obstructing feature, and to determine obstructed portions of the virtual object based on the difference between the range of the virtual object and the range of the amorphous obstructing feature and based on the contour of the amorphous obstructing feature in relation to the virtual object; and
   a display, configured to display the virtual object superimposed onto a view of the scene such that the appearance of the virtual object in the displayed view is consistent with the determined effect on visibility as perceived from the scene origin when the detected feature comprises a non-obstructing feature, the display further configured to display the virtual object superimposed onto a view of the scene such that the determined obstructed portions of the virtual object appear obstructed in the displayed view when the detected feature comprises an amorphous obstructing feature.

10. The system of claim 9, further comprising an image sensor, configured to capture an image of the scene, wherein the virtual object is displayed on the captured image.

11. The system of claim 9, wherein the display comprises a see-through display, configured to display the virtual object overlaid onto a view of the scene.

12. The system of claim 9, wherein the non-obstructing feature comprising an amorphous non-obstructing feature.

13. The system of claim 9, wherein the virtual object is displayed with at least one visual attribute modified.

14. The system of claim 13, wherein the visual attribute is selected from the group consisting of:
   brightness;
   contrast; and
   color intensity.

15. The system of claim 9, wherein the environmental feature at the scene or the effect on visibility is determined using at least one source selected from the group consisting of:
- image processing;
- a comparison of different images of the scene;
- an examination of spectral properties of an image of the scene;
- information relating to the scene obtained from at least one sensor;
- a geographic information source;
- a weather/climate information source;
- a digital terrain model;
- a prediction model;
- a machine learning process; and
- a manual indication.

16. The system of claim 9, wherein determining the effect on visibility due to the non-obstructing feature comprises determining the effect of shadows in the scene, based on detected shadow casting elements and the relative location of at least one light source in the scene.

17. The system of claim 9, further comprising at least one sensor, configured to detect information relating to environmental features in the scene.

18. The system of claim 9, further comprising a database, comprising information relating to environmental features in the scene.

19. The system of claim 9, wherein the image sensor is situated on a moving platform.

\* \* \* \* \*